Oct. 27, 1931.                E. D. MILLER                1,828,936
                            CAN FILLING MACHINE
                          Filed July 11, 1929         4 Sheets-Sheet 3
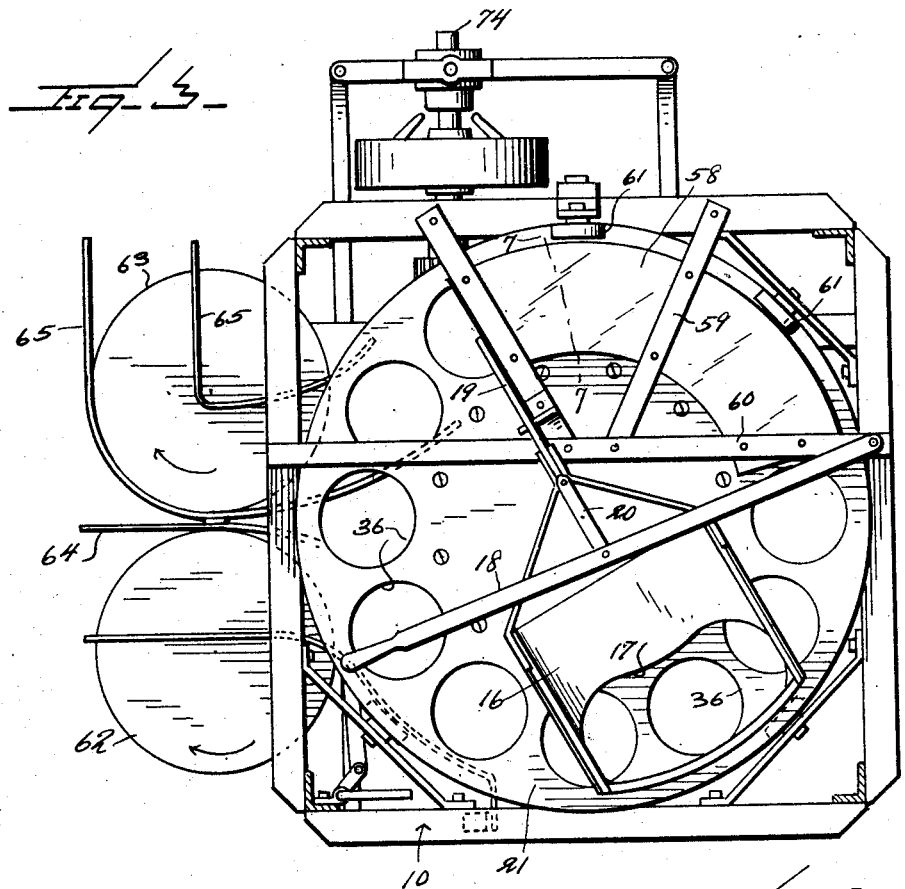
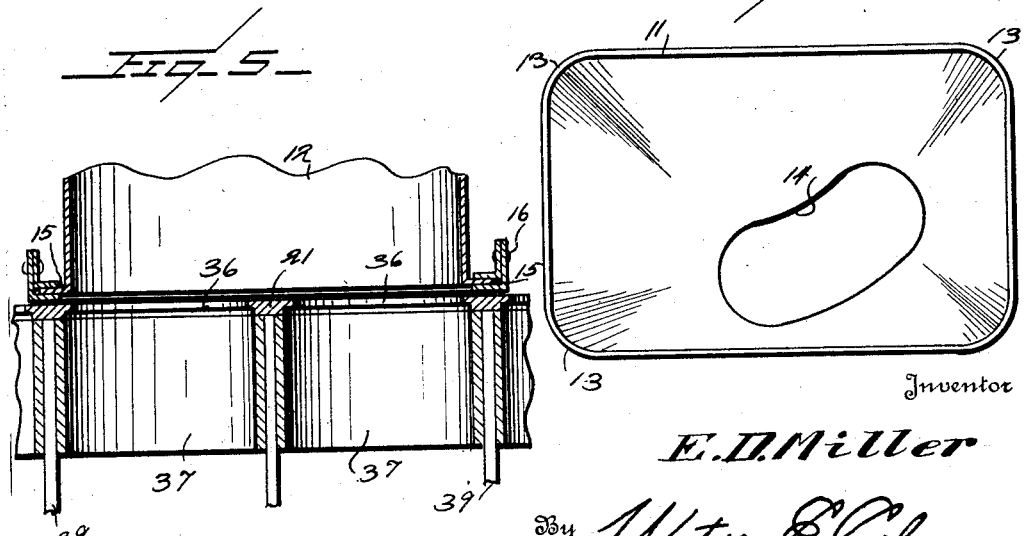

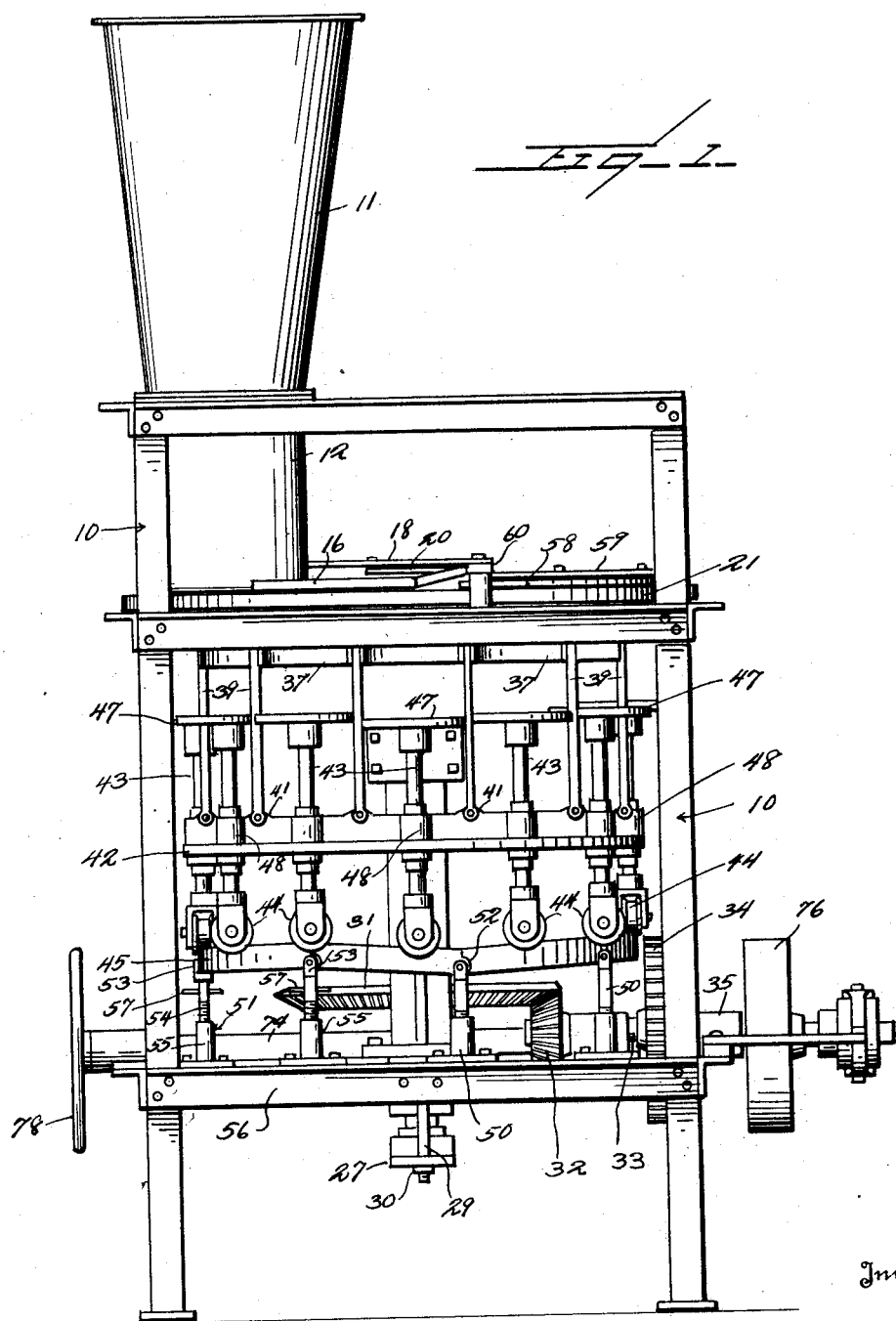

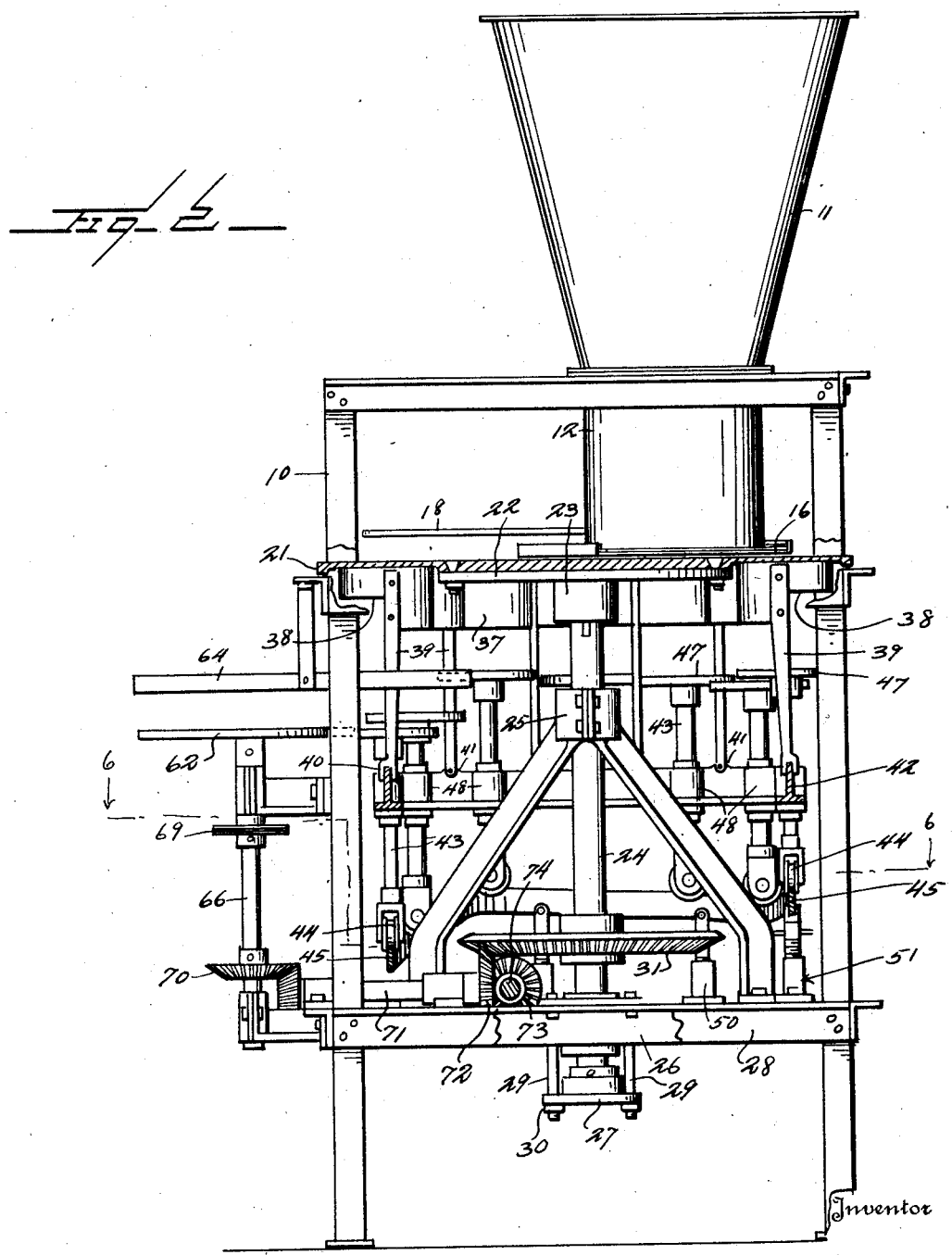

Oct. 27, 1931.  E. D. MILLER  1,828,936
CAN FILLING MACHINE
Filed July 11, 1929   4 Sheets-Sheet 4
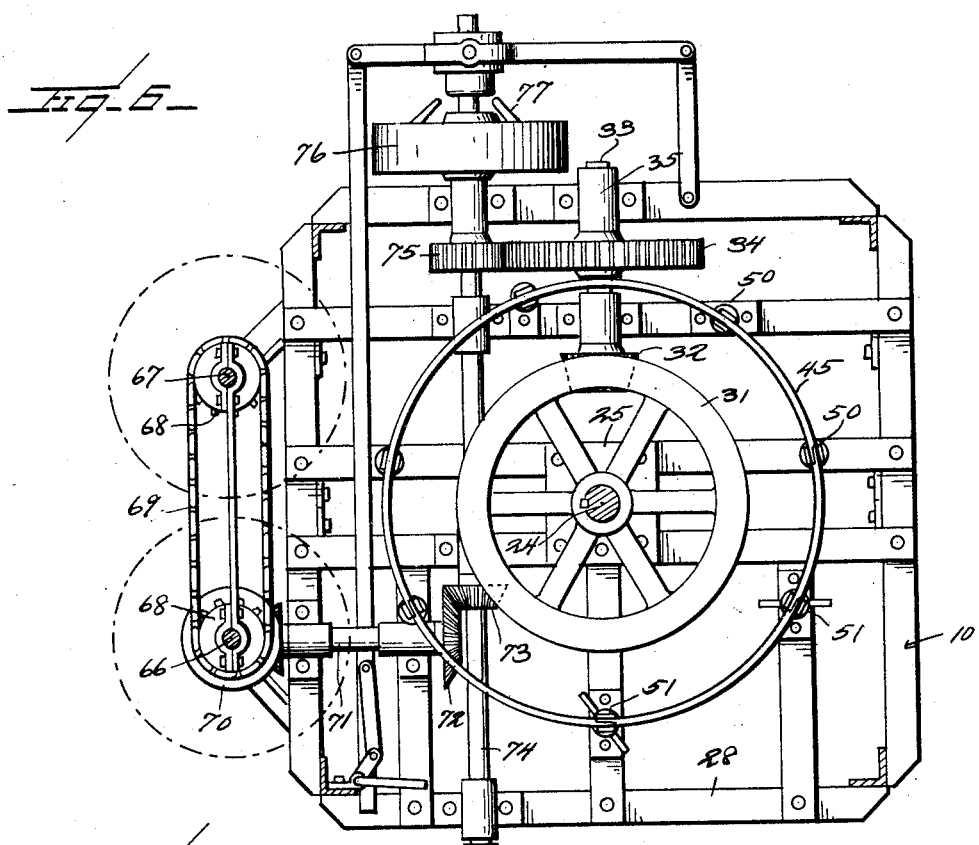
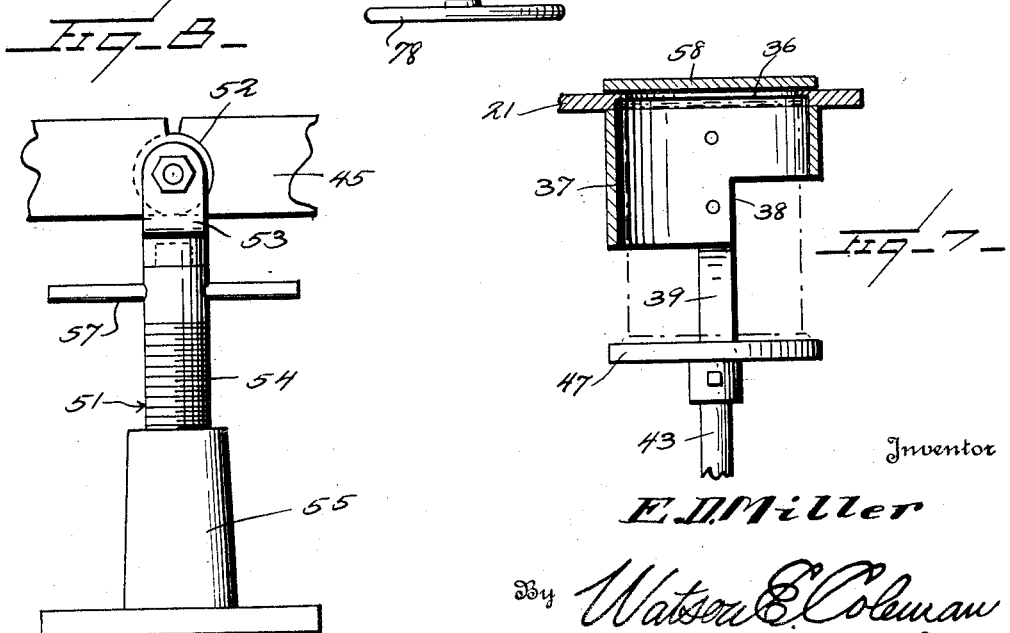

Patented Oct. 27, 1931

1,828,936

UNITED STATES PATENT OFFICE

EDWARD D. MILLER, OF INWOOD, WEST VIRGINIA, ASSIGNOR TO THE C. H. MUSSELMAN COMPANY, OF BIGLERVILLE, PENNSYLVANIA, A CORPORATION OF PENNSYLVANIA

CAN FILLING MACHINE

Application filed July 11, 1929. Serial No. 377,426.

This invention relates to can filling machines and particularly to machines used for filling cans with sliced or quartered apples or other fruit or beans in the pod or other vegetables, the machine being particularly adapted for filling cans with sliced apples that have been preheated, thus producing what is known as a "solid pack". Thereafter the material put into the cans will be referred to as fruit, but it will be understood that the machine is designed for filling cans with any material.

In packing fruit in cans, one of the main difficulties has been to secure an exact or predetermined amount of fruit in each can so that the cans will be of uniform weight when filled as if the can is filled with fruit from a hopper and struck, the fruit will eventually jar down or settle until an empty space is left within the can. If on the other hand the can is over filled the amount of over filling will constantly vary and no two cans will receive the same amount.

Furthermore in packing fruit which has been cut up into different sizes the amount of overfill for one character of fruit will be different from the amount of overfill for another kind of fruit and the machine which will properly pack fruit, the slices or particles of which are of one size will not properly fill cans of fruit whose particles are of a different size.

With these facts in mind, one of the objects of the present invention is to provide means which will permit a can to be completely filled or initially overfilled to a predetermined extent, and which means is capable of regulation even while the machine is running to secure an exact and uniform filling of the cans.

Another object is to provide means whereby if it is seen that the cans are not receiving a proper amount of fruit or if it is seen that the cans are receiving too much fruit, the regulation of the machine may be changed to secure the proper filling of the cans.

A further object of the invention is to provide a mechanism which is relatively simple, easily adjusted, capable of rapid operation and which requires no timing regulation.

A further object is to provide mechanism of this character in which the upper ends of the cans are received within sleeves or collars mounted upon a rotating plate, rotatable to bring the cans and sleeves one by one beneath the hopper and provide means whereby the cans may be raised or lowered within said collars so as to adjust the can to bring the bottom of the can to any desired distance from the top of the collar, the collar constituting under these circumstances a continuation of the can which will receive a mass of fruit which initially extends beyond the top of the can and in this connection, to provide means whereby this fruit may be forced gently into the can in order that the can may be completely filled.

A further object is to provide for this purpose an adjustable rail upon which the cans are carried, the rail being vertically adjustable so as to bring the cans into any desired relation to the tops of their collars and thus secure a proper filling of the can with fruit.

A further object is to provide an improved form of hopper which is so constructed that the fruit will not bridge over the mouth of the hopper, but will discharge into each can and collar as the can and collar is brought around beneath the opening of the hopper.

A further object is to eliminate the necessity of using any measuring vessel or receptacle for measuring the fruit prior to its being placed within the can.

Another object is to provide for scraping the fruit from the top of the collar, that is, for "striking" the collar and can at only one place in the length of travel of the can and collar while with other measuring devices known to me it is necessary to "strike" the measure at least in two other places.

Other objects will appear in the course of the following description.

My invention is illustrated in the accompanying drawings, wherein:—

Figure 1 is an end elevation of a can filling machine constructed in accordance with my invention;

Figure 2 is a vertical transverse section thereof;

Figure 3 is a top plan view of a structure shown in Figures 1 and 2;

Figure 4 is a top plan view of the hopper;

Figure 5 is an enlarged fragmentary section through the lower end of the feed hopper and the collars and supporting plate operating below the same;

Figure 6 is a section on the line 6—6 of Figure 2;

Figure 7 is a fragmentary section on the line 7—7 of Figure 3;

Figure 8 is a detailed elevation of the means whereby the sections of the track may be raised.

10 designates the frame of the machine which may be constructed in any suitable manner, the necessary detailed construction being referred to in the course of this description. Mounted upon the top of the machine is the supply hopper 11 which opens into a feed hopper 12. The supply hopper is shown in Figure 4 as approximately rectangular in plan view but has rounded corners 13 and this feed hopper slants downward to a somewhat arcuate or reniform opening 14.

The feed hopper 12 has the same shape in cross section as the shape of the opening 14, this being in the form of what may be termed a somewhat elongated oval having rounded ends and being arcuately curved. It will be seen that this opening 14 on the central axis of the supply hopper 11 is nearer one corner of this hopper than the other corners and nearer to one side of the hopper than the other sides. This irregularity and unsymmetrical disposition of the opening of the hopper I have found tend to secure an irregular movement of the fruit downward in the hopper and prevents the fruit from bridging over the opening of the hopper as does occur, so experience has shown me, where a hopper is used with the discharge opening thereon in symmetrical relation to the hopper or as it may be termed concentric thereto.

As illustrated, the lower end of the hopper is flanged and bolted upon the flange which forms the upper end of the feed hopper 12. The lower end of this hopper 12 is laterally flanged as at 15 and mounted to slide across this flange is a cut-off plate 16 having adjacent its outer end an opening 17 of exactly the same shape and area as the opening of the lower end of the hopper 12. The remainder of this plate is imperforate so that when this plate is shifted radially outward by means of the pivoted handle or lever 18, the plate will be shifted across the discharge opening of the hopper to cut off the flow of fruit and when the plate is shifted inward, it permits the flow of fruit. The plate 16 is shown as being mounted upon a bifurcated shank 19 to which the lever 18 is connected by a link 20, this lever being mounted in suitable guides on certain pressure plate supports which will be afterwards referred to.

Disposed immediately below the cut-off plate 16 is a revolving plate 21 which is carried upon and bolted to a turn table 22 having a hub 23 (see Figure 2) which is mounted upon a vertical shaft 24. This shaft is supported in suitable bearings 25 and 26 and at its lower end is supported by a step bearing 27 held to the supporting beams 28 of the frame 10 by means of supporting bolts 29. By adjusting the nuts 30 on these bolts, the step bearing and the shaft 24 may be raised or lowered. This shaft 24 carries upon it the beveled gear wheel 31 in turn driven by a beveled gear wheel 32 carried upon an outwardly extending shaft 33 carrying a gear wheel 34 and mounted in bearings 35. Power is transmitted to the shaft 33 and thus to the vertical shaft 24.

The plate 21 is formed as shown in Figure 3 with a plurality of circular openings 36 of the same size in diameter as the interior diameter of the can to be used and the plate 21 is formed around each of the openings 36 with downwardly directed collars 37. Each collar is cut away upward from its lower edge as at 38 for half the diameter of the collar so that for half the diameter of the collar, it is relatively shallow and for the remainder of the diameter it is relatively deep. The inner faces of these collars incline upward and inward very slightly at their upper ends so as to prevent cans being forced upward through the collars 38 beyond the upper edge thereof. Attached to each of these collars is a depending arm 39 which at its lower end is bifurcated at 40 (see Figure 2) and this bifurcated end fits over lugs 41 on a bearing ring 42 T-shaped in cross section. This bearing ring carries platen spindles or stems 43 which are bifurcated at their lower ends and carry the rollers 44 which bear upon a sectional adjustable track 45 which will be later described.

The ring 42 immediately beneath each collar 37 carries upon it a stem 43 supporting a platen 47 which has a diameter large enough to support the can. When this platen rises, the can will be raised gently into the corresponding collar, to an extent determined by the adjustment of the track 45. The stems or spindles 43 are slidingly disposed each through a sleeve 48 formed upon the ring 42. This I regard as one of the most important features of my invention for the reason that it permits such an adjustment of the can within the collar as will absolutely control the amount of fruit which is deposited in the cans and this adjustment may be made at any time either to increase or decrease the amount being filled into the cans.

The track 45 is formed of a plurality of arcuate sections. The track is held from rotation on the frame 10 of the machine and has grades varying in different parts of the circle by which the height of the can is regulated at different positions of the can during the process of filling. The track is shown as being supported by track supports 50 which are not adjustable and by certain adjustable track supports designated generally 51. Directly under each end of the feed hopper, the corresponding section of the track 45 has the adjustable supports 51, the sections of the track being connected by hinge joints at 52, these hinge joints being pivotally connected to a cap 53 which is mounted upon a vertically movable adjustable screw 54 having screw-threaded engagement with a base 55 attached to the frame of the machine as for instance to the frame bar 56 thereof. The adjusting screw 54 is provided with handles 57 whereby it may be rotated. The cap 53 has swiveled engagement with the upper end of the screw so that the screw may be shifted to raise or lower this portion of the track without rotating the cap 53.

The two non-adjustable supports 50, one on each side of the adjustable supports also have hinge joints and thus the track may be moved up or down immediately below the hopper to thus regulate the amount of fruit that is packed into each can.

After a can has passed the feed hopper and been filled with fruit, the can passes below a pressure plate 58 which is arcuate in shape and has an angular length somewhat greater than a quarter of a circle. This segmental pressure plate covers about four and one-half openings in the rotatable plate 21. The pressure plate is mounted upon the pressure plate supports 59 which are connected to the frame of the machine and to a transverse cross bar 60. The pressure plate is disposed as close to the upper face of the revolving plate 21 as can be without causing friction. In order to further prevent the possibility of friction by any upward pressure on the revolving plate, two rollers 61 are mounted upon the frame of the machine to bear against the margin of the rotatable plate 21, these rollers being disposed exteriorly to the pressure plate 58.

At this point, the track 45 has an upward inclination so that the filled can, as will be later more explicitly stated, is gradually raised until it reaches its highest possible position in the cup 37, thus pressing the fruit down into the can, leaving the top surface of the fruit even and level. At the end of the pressure plate, the rail 45 extends downward at a relatively rapid inclination so as to cause the downward movement of the platen sufficiently to cause the can supported thereby to disengage from the cup or collar 37 and the discharge of the can from the machine.

The cans are fed to the machine by means of the rotatable disk 62 and discharged by the disk 63.

The disk 62 rotates in a clockwise direction and cans are carried by this disk into position successively upon the rotating platens 47 and into engagement with the lower semi-circular portions of the collars 37. The disk 62 revolves with a surface speed greater than the speed of the can in the machine and, therefore, always keeps an empty can ready to be pushed into the notch or opening at the lower end of each collar as the collar comes into position. The can is thus pushed in on to the corresponding platen which is brought low enough to receive the can by a lowering in the height of the track to this point. The empty can is received from the disk 62 which rotates in the same direction as the disk 63, the cans being guided into the machine by means of the can guides 64 and out of the machine by means of the can guides 65. As illustrated the two disks 62 and 63 are mounted upon two vertical shafts 66 and 67 carrying sprocket wheels 68 over which a sprocket chain 69 passes, the shaft 66 carrying a beveled gear wheel 70 which is engaged by a beveled gear wheel on the shaft 71. This shaft 71 in turn carries a beveled gear wheel 72 meshing with a gear wheel 73 mounted upon a shaft 74 extending at right angles to the shaft 71. This shaft 74 carries upon it a pinion 75 meshing with the gear wheel 34 and mounted upon the shaft 74 is the pulley 76 which is loose upon the shaft, but is adapted to be engaged therewith by the clutch 77. Thus power is transmitted to the operating mechanism and by shifting the clutch, this power may be cut off. A hand wheel 78 is mounted upon the shaft 74 also so that the shaft 74 may be turned by hand in making adjustments of the machine so that the machine may be operated slowly and the exact cycle of operations noted and adjustments be made.

The operation of this mechanism is as follows:—

The cans to be filled are delivered from a chute or can run or in any manner to the upper surface of the revolving disk 62. As before noted, the disk revolves with a certain speed greater than the speed of rotation of the can plate 21 with its connected ring 42 and, therefore, an empty can is always ready to be pushed into the notch formed at the lower end of each collar 37. The can is thus pushed in on to the platen 47 which at this point is lowered by the downward inclination of the track 45. At this point, the can is thus disposed with its upper margin within the corresponding collar and as the can plate 21 revolves, the arms, the bearing ring 42 and the platens 47 all revolve with the can carrier, all of these parts having the same radius as that of the centers of the openings in the plate. An empty can placed upon the platen 47 is gradually pushed upward into the cup or collar by reason of the upward inclination in the circular track. When the can reaches the position under the opening of the hopper, it has been raised to the proper point to be filled. The degree to which the can may be raised within the collar is regulated by adjusting screws 54. As the opening in the plate 21 over the can passes under the hopper, the hopper being filled with fruit, the fruit falls into the can by gravity to an extent sufficient to fill not only the can but the upper portion of the collar up to the surface of the revolving can carrier plate 21. The feed hopper being a little more than twice as long as the diameter of the can and being curved in shape to conform to the shape of the travel of the openings in the plate, the fruit has sufficient time to settle into the can and the pull in the direction of travel of the fruit remaining in the hopper, prevents the fruit from bridging or sticking in the hopper, this being assisted by the peculiar form of the hopper itself.

Since the can is always filled to the top surface of the plate 21 and the fruit is then scraped off on the top surface of the plate and the same fruit, that is the amount of fruit between the bottom of the can and the surface of the plate 21, is later all pressed into the can, it is obvious that the exact weight of the fruit can be regulated with precision by the height of the can in the cup 37 at the point of filling. As the filled can continues in its travel in the machine, it is lowered from the point of filling by a downward inclination of the track 45 and passes beneath the pressure plate 58. At this point the track has a slight upward inclination and the filled can is gradually raised until it reaches its highest possible position in the cup, thus pressing the fruit down into the can, leaving the top surface of the fruit even and level. As the can leaves the pressure plate it is rapidly lowered by a downward inclination of the circular track 45 and when the platen has reached its lowest point, the filled can strikes the projecting guide 65 and is guided on to the discharge table 63 which quickly carries away the can and delivers it to a conveyor or any means of handling the filled cans for further processing.

Attention is again called to the particular feature of my machine which permits the exact quantity of fruit to be filled into the cans and permits an adjustment of this quantity at any time. This is secured, as before stated, by so regulating the sections of the track 45 by means of the screws 54 that a can may be lifted by means of its platen further up into the corresponding collar 37 or not so far up into this collar. If the can is raised fully up into the collar, it will be obvious that it can only be filled to the can rim.

If the can be raised only a little way up beyond the cut-away portion 38, the collar will form a relatively long extension of the can and more fruit can, therefore, be filled into the can. By adjusting the screws 54, which can be done while the machine is in motion, the exact weight of fruit necessary to be placed in the cans can be definitely secured. This method eliminates the necessity of any other vessel or device for measuring the fruit as the fruit is measured only in a new clean can in which it is placed. If it is desired to make the pack heavier, the adjusting screw or screws 54 is or are turned down lowering the track. If it be desired to make the pack lighter, the adjusting screw is turned up raising the track and consequently the can at the point of filling. Just as the filled can leaves the hopper, the track is slightly dropped to relieve the can as the fruit is scraped off the opening in the plate, thus reducing to a minimum the tendency to mash any pieces protruding over the top of the can. By this method of measuring there is only one place for the fruit to be scraped while in other measuring devices there are at least two additional places where the scraping must be done.

This machine is continuous in its operation. There is a constant flow of empty cans into the machine and near the same point, a constant flow of filled cans out of the machine. The flow of cans never stops during the regular operation of the machine. Therefore, the machine may be run at a much higher speed of cans per minute than any machine where the cans stop and start during the operation, or in other words, where the cans move only intermittently. There is no part of this machine which requires any timing or that can get out of time as the only parts that work in exact timed relation to each other are all an integral part of the same unit and, therefore, cannot be put out of time.

The cans are handled very carefully. When an empty can is placed in the machine, the surfaces beneath the can, on each side of it and over the top are all moving in the same direction. Thus the can is carried level at all times without any slipping or sliding except the friction of the disks which feed the can to the machine and take the can out of the machine. Only a minimum of power is required for this machine and a fast operation is accomplished with a slow speed. A machine with twelve openings in the revolving plate 21 running at a speed of three revolutions per minute will fill and deliver thirty-six cans per minute and the same machine with the same carrier revolving at four revolutions per minute which is a very slow speed will fill and deliver forty-eight cans per minute.

It will be seen that the machine is very simple and cannot readily get out of order, that it can be readily adjusted at any time and also that it might be modified in many

I claim:—

1. In a can filling mechanism, a plurality of can supports movable in a closed path, each can support being vertically movable independently of any other support, a plate mounted above the can supports and movable coincidently therewith and having openings disposed immediately above the can supports and collars attached to the plate and depending from said openings which collars are larger in internal diameter than the exterior diameter of the cans and within which collars the upper ends of the cans on said supports may be carried, the collars normally extending upward above the several cans to permit the cans to be overfilled to an extent corresponding to the height of the collars above the cans, means at one point for discharging fruit into a collar and the corresponding can, a pressure plate disposed above the first named plate, and means acting to lift the successive can supports upward to carry the can mounted thereon upward through a collar and toward the pressure plate to thus compress the material within the can, said means then acting to lower said can support to carry the can out of said collar.

2. In a can filling machine, a hopper having an elongated arcuate discharge opening, a rotatable plate disposed immediately below the hopper and having a plurality of circular openings adapted as the plate is rotated to be brought successively into position beneath the discharge opening of the hopper and moved therealong, the plate having collars attached thereto and extending downward from and defining each of said openings, the collars having an interior diameter larger than the diameters of the cans to be filled, a series of vertically movable can supports rotatable with the plate and disposed one below each of said collars, each can support having a roller at its lower end, a circular track disposed below the can supports and engageable with said rollers, said track being raised below the opening of the hopper to thereby cause the can supports to be lifted as they approach the hopper and the cans mounted upon said supports to be shifted upward within the corresponding collar, a pressure plate disposed beyond the opening in the hopper and above the path of movement of the openings in the rotatable plate, the track being raised to cause the can supports to be lifted as the cans pass beneath the pressure plate to thereby force any material contained within the collars downward into the cans on the supports, means whereby cans may be disposed upon the supports as they rotate, and means for removing the cans from the supports.

3. In a can filling machine, a hopper having an elongated arcuate discharge opening, a rotatable plate disposed immediately below the hopper and having a plurality of openings adapted as the plate is rotated to be brought successively into position beneath the discharge opening of the hopper and moved therealong, the plate having depending collars extending downward from and defining each of said openings, a series of vertically movable can supports rotatable with the plate and disposed one below each of said collars, each can support having a roller at its lower end, a circular track disposed below the can supports and engageable with said rollers, said track including vertically adjustable sections whereby as a can support nears the opening of the hopper it may be raised to raise the corresponding can a predetermined distance into the collar to thus control the amount of extra material disposed within the collar above the mouth of the can, a pressure plate disposed beyond the opening in the hopper and above the path of movement of the openings in the rotatable plate, the track being raised to cause the can supports to be lifted as the cans pass beneath the pressure plate to thereby force the material contained within the collars downward into the cans on the supports, means whereby the cans may be disposed upon the supports as they rotate, and means for removing the cans from the supports.

4. A can filling machine including a hopper having an elongated arcuate discharge opening, a plate rotatably mounted just below the lower end of the hopper, the plate having a series of openings traveling successively beneath the opening in the hopper, a vertical shaft supporting said plate, power operated means for rotating the shaft, each of said openings having a depending collar, the lower portion of which is semi-circular, a ring supported by and rotatable with said plate, a series of vertical rods slidingly supported in said ring, each rod carrying a can support disposed immediately below and in alinement with an opening in the rotatable plate, the lower end of each rod carrying a wheel, a circular track upon which said wheels travel, the track including vertically adjustable sections, manually operable means whereby the sections of the track may be adjusted to cause each can support to move upward and shift the can thereon upward into a corresponding collar a distance determined by the adjustment of the track as the can support nears the discharge opening of the hopper and travels along said discharge opening, the sections being adjustable to cause a slight downward movement of the can supports just before the can passes the opening of the hopper, a pressure plate disposed beyond the hopper and disposed above the path of movement of the openings in said rotatable plate, said track being adjustable to cause each can support to move upward while the corresponding opening is traveling beneath the pressure plate to thus cause the pressure plate to force the material in each collar into its corresponding can, the track then acting to lower the can support to a position where the can may escape from the collar.

5. A can filling machine including a hopper having an elongated arcuate discharge opening, a cut-off manually shiftable across the discharge opening of the hopper, a plate rotatably mounted just below the lower end of the hopper and said cut-off plate, the plate having a series of openings traveling successively beneath the opening in the hopper, a vertical shaft supporting said plate, power-operated means for rotating the shaft, each of said openings having a depending collar, the upper portion of which is circular, the lower portion of which is semi-circular, a ring supported by and rotatable with said plate, a series of vertical rods slidingly supported in said ring, each rod carrying a can support disposed immediately below and in alinement with an opening in the rotatable plate, the lower end of each rod carrying a wheel, a circular track upon which said wheels travel, the track including vertically adjustable sections, manually operable means whereby the sections of the track may be adjusted to cause each can support to move upward and shift the can thereon upward into a corresponding collar a distance determined by the adjustment of the track as the can support nears the discharge opening of the hopper and travels along said discharge opening, the sections being adjustable to cause a slight downward movement of the can supports just before the can passes the opening of the hopper, an arcuate pressure plate disposed below the hopper and disposed above the path of movement of the openings in said rotatable plate, said track being adjustable to cause each can support to move upward while the corresponding opening is traveling beneath the pressure plate to thus cause the pressure plate to force the material into the corresponding collar of each can, the track then acting to lower the can support to a position where the can may escape from the collar.

6. In a can filling machine, a hopper, a series of rotatable can supports adapted to be moved successively into position beneath the hopper and having vertically disposed stems carrying rollers at their lower ends and means for shifting the can supports vertically with relation to the hopper, comprising a circular track with which the rollers on the lower ends of the stems engage, said track being composed of a fixed section and a plurality of flexibly connected sections, means for vertically adjusting the flexibly connected sections including vertically disposed screws having swiveled engagement with the track and bases into which said screws threadedly engage.

7. In a can filling machine, a supporting frame, a hopper mounted thereon and having an elongated arcuate discharge opening, a vertical shaft mounted in said frame, power operated means for constantly rotating said shaft, a plate mounted upon the upper end of the shaft and having a plurality of openings each having the diameter of the can, the openings being brought successively beneath the opening in the hopper, each opening having a depending collar adapted to receive the upper end of a can, a ring operatively supported from said plate and rotatable with the plate and shaft and having vertical bearings at intervals, the can supports having stems extending down through said bearings vertically slidable therein and carrying rollers at their lower ends, a track supported upon said frame and with which said rollers engage, the track including successively connected vertically adjustable sections, means for vertically adjusting said last named sections of the track, to thereby cause the can supports to successively lift to thereby dispose the upper end of each can within the corresponding collar and lift the can up a predetermined distance within said collar as the can moves beneath the opening of the hopper, an arcuate pressure plate disposed beyond the hopper and beneath which the cans and collars successively pass, the adjustable sections of the track acting to lift each can upward within the corresponding collar to thereby cause the pressure plate to force the material within said collar into said can, the track then acting to lower the successive cans from within the corresponding collars to permit the removal of the cans from the can supports.

8. In a can filling machine, a hopper, a rotatable plate disposed below the opening in the hopper and having a plurality of openings with which the opening in the hopper is adapted to successively register, each of said openings having a depending collar, the collars being larger in internal diameter than the diameter of the cans, a plurality of vertically movable can supports disposed below the said plate and registering with the openings, means whereby cans may be fed one by one on to said supports, adjustable means for raising the supports successively as they move into position beneath the hopper to thus lift the cans mounted upon the supports upward concentrically to and within the corresponding collars a distance corresponding to said adjustment of the raising means, a fixed pressure plate disposed immediately above and adjacent the rotatable plate and above the path of movement of the openings therein, and means acting as each can support passes beyond the opening of the hopper to shift the can support upward concentrically to its corresponding collar to cause the pressure plate to force the fruit contained within said collar downward into the can, and means whereby the cans may be successively removed from said supports.

9. In a can filling machine, a hopper, a series of rotatable can supports adapted to be moved successively into position beneath the hopper and having vertically disposed stems carrying rollers at their lower ends, and means for shifting the can supports vertically with relation to the hopper comprising a circular track with which the rollers on the lower ends of the stems engage, said track being composed of a fixed section, and a plurality of flexibly connected sections, and means for vertically adjusting the flexibly connected sections.

10. In a can filling machine, a hopper, a plurality of vertically movable can supports disposed below the hopper, means carrying the can supports successively past the opening of the hopper whereby the cans may be filled, a plurality of collars, one for each can and disposed above the can supports and below the mouth of the hopper and having an interior diameter greater than the diameter of the cans to be filled, means whereby the can supports may be raised as each can support nears the hopper to carry the upper end of the can into the lower end of the corresponding collar, said means being adjustable whereby the degree of lifting movement of the cans and the degree of their projection into the respective collars can be regulated, a fixed pressure plate disposed above the can supports and beyond the opening of the hopper, and means acting to shift the can supports upward when each support has come beneath the pressure plate to thereby cause the pressure plate to force the material contained in the collar downward into the can.

11. In a can filling machine, a hopper, a rotatable plate disposed below the opening in the hopper and having a plurality of openings with which the opening in the hopper is adapted to successively register, each of said openings having a collar attached to the plate and depending therefrom and larger in diameter than the can to be filled, a plurality of vertically movable can supports disposed below the said plate and registering with the openings, means for feeding cans one by one on to said supports, adjustable means for raising the supports successively as they move into position beneath the hopper to thus lift the cans mounted upon the supports upward into corresponding collars a distance corresponding to said adjustment of the raising means, a pressure plate disposed above the rotatable plate and above the path of movement of the openings therein, and means acting as each can support passes beyond the opening of the hopper to shift the can support upward concentrically with and toward the collar to thereby carry the cans on the can support upward into the collar and toward the pressure plate to thereby cause the pressure plate to force the fruit contained within said hopper downward into the can, and means acting to remove the cans successively from said supports.

In testimony whereof I hereunto affix my signature.

EDWARD D. MILLER.